(No Model.)
H. J. GREEN.
EYEGLASS SUSPENDER.
No. 527,147. Patented Oct. 9, 1894.
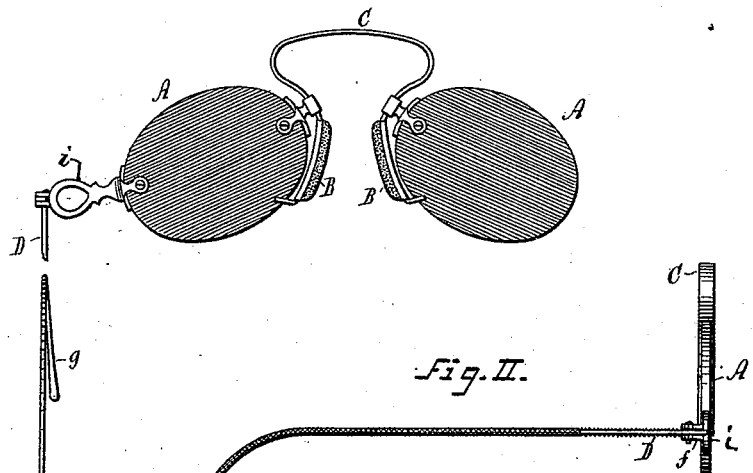
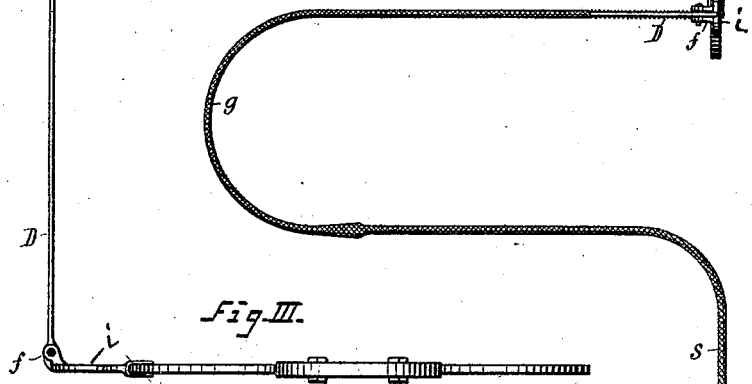
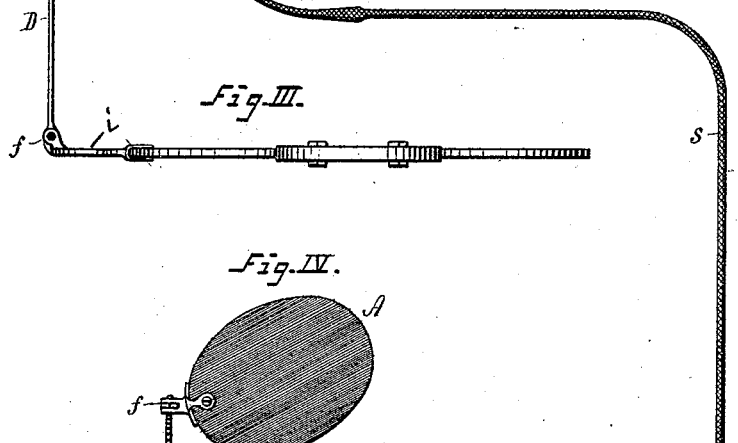
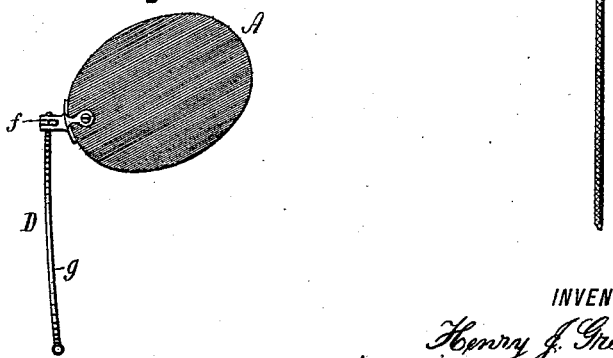
WITNESSES:
Chas. Wahlers
Jas. S. Ewbank
INVENTOR
Henry J. Green.
BY
Francis C. Bowen
ATTORNEY.

UNITED STATES PATENT OFFICE.

HENRY J. GREEN, OF BROOKLYN, NEW YORK.

EYEGLASS-SUSPENDER.

SPECIFICATION forming part of Letters Patent No. 527,147, dated October 9, 1894.

Application filed September 8, 1892. Renewed March 9, 1894. Serial No. 503,064. (No model.)

*To all whom it may concern:*

Be it known that I, HENRY J. GREEN, a citizen of the United States, and a resident of Brooklyn, in the county of Kings and State of New York, have invented certain new and useful Improvements in Eyeglass-Suspenders, of which the following is a specification.

My invention relates to devices for suspending a pair of eyeglasses from an ear of the wearer, and it consists in a novel arrangement of a temple-wire on one of the glasses, and also of a tubular cord combined with said wire, as hereinafter more fully described.

In the accompanying drawings Figure 1. represents a front view of a pair of eyeglasses embodying my invention. Fig. 2. represents a side view thereof. Fig. 3. represents a plan or top view thereof. Fig. 4. represents a front view of one of the glasses with a modification thereof.

Similar letters indicate similar parts.

The letter A indicates the eyeglasses, with the usual nose pieces B, and connecting spring C; and D indicates my temple wire on one of the glasses. This wire D, is similar to that commonly used in spectacles, and its one end is connected to the desired glass by a pivot joint $f$, in such a manner as to adapt the wire to swing in a plane at right angles to the glasses while the other or free end of the wire is bent into the shape of a hook $g$, which is designed to fit and engage the base of the external bar.

In the example shown in Figs. 1, 2 and 3, the joint $f$ is formed on a finger piece $i$ such as is commonly affixed to one of the glasses and usually at the outer extremity of this finger piece, and by this means the wire D may be brought to a position at the side of the face out of contact therewith, thereby least inconveniencing the wearer, while its presence is rendered least manifest to the eye of an observer, since the finger piece imparts to the glasses the ordinary appearance. Said finger piece $i$ however may be omitted and in that event the joint $f$ is formed directly on the proper glass A, as shown in Fig. 4.

It will be apparent that the temple wire D forms a very effective suspender for the eyeglasses on the ear of the wearer, the hook $g$ being simply adjusted on the ear, and when the eyeglasses are not in use the wire may be folded on the joint $f$ parallel with the glasses; said joint also permitting the wire to more readily adjust itself to the ear in use.

Referring to Fig. 2, the temple wire D is fitted and inclosed in one end of a cord $s$ of tubular shape, which is drawn on the wire from its free end and hangs loosely therefrom, permitting it to be fastened to a garment button or other device like the ordinary eyeglass cord. The wire D thus serves to connect the cord $s$ with the glasses and at the same time is protected thereby, against moisture or other injurious influences.

What I claim as new, and desire to secure by Letters Patent, is—

An eyeglass suspender consisting of the temple wire with an ear hook which is connected to the desired glass by a pivot joint, and the tubular cord fitted on said wire at one end, to hang loosely therefrom permitting it to be fastened to a garment button or other device like the ordinary eyeglass cord, substantially as and for the purpose described.

Signed at Brooklyn, in the county of Kings and State of New York, this 14th day of September, A. D. 1891.

HENRY J. GREEN.

Witnesses:
BERNARD FOWLER,
ALBERT E. GREEN.